United States Patent
He et al.

(10) Patent No.: US 12,453,533 B2
(45) Date of Patent: Oct. 28, 2025

(54) ULTRASONIC MEASUREMENT METHOD, SYSTEM, WIRELESS PROBE AND STORAGE MEDIUM

(71) Applicant: SHENZHEN MINDRAY BIO-MEDICAL ELECTRONICS CO., LTD., Guangdong (CN)

(72) Inventors: Xujin He, Shenzhen (CN); Zewei Tan, Shenzhen (CN); Bo Yang, Shenzhen (CN); Jianguang Zhu, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 565 days.

(21) Appl. No.: 17/899,423

(22) Filed: Aug. 30, 2022

(65) Prior Publication Data

US 2022/0409178 A1 Dec. 29, 2022

Related U.S. Application Data

(63) Continuation of application No. PCT/CN2020/078037, filed on Mar. 5, 2020.

(51) Int. Cl.
*A61B 8/00* (2006.01)

(52) U.S. Cl.
CPC .............. *A61B 8/4472* (2013.01); *A61B 8/56* (2013.01)

(58) Field of Classification Search
CPC .................................. A61B 8/4472; A61B 8/56
See application file for complete search history.

(56) References Cited

U.S. PATENT DOCUMENTS 6,901,061 B1 * 5/2005 Joo ................. H04W 36/00837
370/335
9,649,091 B2 5/2017 Halmann
(Continued)

FOREIGN PATENT DOCUMENTS

CN 101682529 A 3/2010
CN 102579079 A 7/2012
(Continued)

OTHER PUBLICATIONS

PCT International Preliminary Report on Patentability mailed Sep. 15, 2022, issued in related International Application No. PCT/CN2020/078037, with English translation (10 pages).
(Continued)

*Primary Examiner* — Jason M Ip
(74) *Attorney, Agent, or Firm* — Sheppard Mullin Richter & Hampton LLP

(57) ABSTRACT

A method comprising: acquiring a predetermined policy, the predetermined policy being a policy of a wireless connection between a wireless probe and a host device; according to the predetermined policy, controlling the wireless probe to selectively connect to one host device from at least two host devices, each of the at least two host devices at least having a component for wirelessly connecting to the wireless probe; controlling the wireless probe to transmit ultrasonic waves to a target object and receive echoes based on the ultrasonic waves to obtain ultrasonic echo signals; and controlling the wireless probe or the host device connected to the wireless probe to process the ultrasonic echo signals to obtain target ultrasonic data of the target object, and displaying the target ultrasonic data by the host device connected to the wireless probe.

19 Claims, 7 Drawing Sheets

(56) References Cited

U.S. PATENT DOCUMENTS

| | | | |
|---|---|---|---|
| 2005/0049495 A1 | 3/2005 | Sumanaweera et al. | |
| 2008/0114241 A1 | 5/2008 | Randall et al. | |
| 2009/0105597 A1* | 4/2009 | Abraham | A61B 8/445 |
| | | | 604/95.01 |
| 2014/0180110 A1 | 6/2014 | Schmedling | |
| 2014/0323869 A1 | 10/2014 | Jin et al. | |
| 2017/0105703 A1* | 4/2017 | Han | G01N 29/2481 |
| 2017/0360413 A1* | 12/2017 | Rothberg | A61B 8/585 |
| 2018/0263600 A1 | 9/2018 | Bell et al. | |
| 2019/0059855 A1* | 2/2019 | Jin | A61B 8/4472 |
| 2019/0286297 A1 | 9/2019 | Wilson et al. | |

FOREIGN PATENT DOCUMENTS

| | | |
|---|---|---|
| CN | 106580366 A | 4/2017 |
| CN | 107847212 A | 3/2018 |
| CN | 110604590 A | 12/2019 |
| JP | 2013-094341 A | 5/2013 |

OTHER PUBLICATIONS

First Office Action and Search Report dated May 28, 2024, issued in related Chinese Application No. 202080080840.7, with English machine translation (25 pages).

PCT International Search Report and the Written Opinion mailed Nov. 27, 2020, issued in related International Application No. PCT/CN2020/078037, with partial English translation (11 pages).

\* cited by examiner

ULTRASONIC MEASUREMENT METHOD, SYSTEM, WIRELESS PROBE AND STORAGE MEDIUM

CROSS-REFERENCE TO RELATED APPLICATION

The application is a continuation application of International Patent Application No. PCT/CN2020/078037, filed with the China National Intellectual Property Administration (CNIPA) on Mar. 5, 2020. The entire content of the above-identified application is incorporated herein by reference.

TECHNICAL FIELD

The present application relates to ultrasonography, in particular to ultrasonic measurement methods, systems, wireless probes and storage media.

BACKGROUND OF THE INVENTION

Ultrasound technology has become the most widely used and most frequently used examination method due to its high reliability, fast and convenience, real-time imaging and repeatable examination in modern medical imaging examination. The development of some new ultrasonic technology has further promoted the application of ultrasound imaging in clinical diagnosis and treatment.

In existing ultrasonic measurement methods, probes and host devices are usually in a fixed one-to-one relationship, so it is impossible to select different host devices according to different application scenarios. For example, in an application scenario where there needs to perform ultrasonic measurement across buildings or floors and an ultrasonic system currently provided is composed of a probe and an ultrasonic host, it is inconvenient to use the ultrasound host due to its weak portability. For another example, in an application scenario which requires better ultrasound image display effect, the ultrasonic system currently provided is composed of a probe and a smart terminal, it is also inconvenient to use the smart terminal due to its usually small screen and poor display effect. Therefore, the existing ultrasonic measurement methods cannot cover the diversified business needs.

SUMMARY OF THE INVENTION

The present application provides an ultrasonic measurement solution, which can control a wireless probe to select an appropriate host device for connection according to a predetermined policy, so as to meet different business requirements in different application scenarios. The ultrasonic measurement solution proposed by the present application will be briefly described below, and more details will be described later in specific embodiments with reference to accompanying drawings.

According to an aspect of the present application, an ultrasonic measurement method is provided. The method may include: acquiring a predetermined policy, the predetermined policy being a policy involving a wireless connection between a wireless probe and a host device; controlling the wireless probe to selectively connect to one host device from at least two host devices according to the predetermined policy, each of the at least two host devices at least having a component for wirelessly connecting to the wireless probe; controlling the wireless probe to transmit ultrasonic waves to a target object and receive echoes based on the ultrasonic waves to obtain ultrasonic echo signals; and controlling the wireless probe or the host device connected to the wireless probe to process the ultrasonic echo signals to acquire target ultrasonic data of the target object, and display the target ultrasonic data by the host device connected to the wireless probe.

According to another aspect of the present application, an ultrasonic measurement method is provided. The method may include: acquiring a predetermined policy, the predetermined policy being a policy involving a wireless connection between a wireless probe and a host device; controlling the wireless probe to selectively connect with one of at least two host devices according to the predetermined policy, each of the at least two host devices at least having a component for ultrasound imaging and a component for wirelessly connecting with the wireless probe, or each of the at least two host devices at least having a component for wirelessly connecting with the wireless probe; and controlling the wireless probe and the host device to which the wireless probe is connected to jointly perform ultrasound imaging on the target object.

According to still another aspect of the present application, an ultrasonic measurement method executed by a wireless probe is provided. The method may include: acquiring a predetermined policy, the predetermined policy being a policy involving a wireless connection between a wireless probe and a host device; selectively connecting to one of at least two host devices according to the predetermined policy, each of the at least two host devices at least having a component for ultrasound imaging and a component for wirelessly connecting with the wireless probe, or each of the at least two host devices at least having a component for wirelessly connecting with the wireless probe; and after being connected to one of the at least two host devices, performing ultrasound imaging on a target object jointly with the connected host device.

According to yet another aspect of the present application, a wireless probe is provided. The wireless probe may include: a communication port a processor and a memory storing a computer program executed by the processor, the computer program performing the following operations when executed by the processor: acquiring a predetermined policy, the predetermined policy being a policy involving a wireless connection between a wireless probe and a host device; selectively connecting to one of at least two host devices via the communication port according to the predetermined policy, each of the at least two host devices at least having a component for ultrasound imaging and a component for wirelessly connecting the wireless probe, or each of the at least two host devices at least having a component for wirelessly connecting the wireless probe; and after being connected to one of the at least two host devices, performing ultrasound imaging on a target object jointly with the connected host device.

According to still yet another aspect of the present application, an ultrasonic measurement system is provided. The system may include: a wireless probe and at least two host devices, each of the at least two host devices at least having a component for wirelessly connecting with the wireless probe, the wireless probe being configured to acquire a predetermined policy involving wirelessly connecting with the host device and to selectively connect to one of the at least two host devices according to the predetermined policy to jointly perform ultrasound imaging on a target object with the connected host device, wherein jointly performing ultrasound imaging on the target object comprises: transmitting ultrasonic waves to the target object and receiving echoes based on the ultrasonic waves to obtain ultrasonic echo signals by the wireless probe; processing the ultrasonic echo signals by the wireless probe or the host device to which the wireless probe is connected to acquire target ultrasonic data of the target object, and displaying the target ultrasonic data on the host device to which the wireless probe is connected.

According to yet still another aspect of the present application, provided is a storage medium, on which a computer program is stored, executing the ultrasonic measurement method mentioned above when the computer program being rm.

With the ultrasonic measurement method, system, wireless probe, and storage medium according to the embodiments of the present application, the wireless probe can be controlled to select an appropriate host device for connection according to a predetermined policy, so as to meet different business requirements in different application scenarios.

DETAILED DESCRIPTION

In order to make the objectives, technical solutions, and advantages of the present application clearer, example embodiments according to the present application will be described in detail below with reference to the accompanying drawings. Apparently, the described embodiments are merely some rather than all of the embodiments of the present application. It should be understood that the example embodiments described herein do not constitute any limitation to the present application. All other embodiments derived by those skilled in the art without creative efforts on the basis of the embodiments of the present application described in the present application shall fall within the scope of protection of the present application.

In the following description, a large number of specific details are given to provide a more thorough understanding of the present application. However, it would be understood by those skilled in the art that the present application can be implemented without one or more of these details. In other examples, to avoid confusion with the present application, some technical features known in the art are not described.

It should be understood that the present application can be implemented in different forms and should not be construed as being limited to the embodiments presented herein. On the contrary, these embodiments are provided to make the disclosure thorough and complete, and to fully convey the scope of the present application to those skilled in the art.

The terms used herein are intended only to describe specific embodiments and do not constitute a limitation to the present application. When used herein, the singular forms of "a", "an", and "said/the" are also intended to include plural forms, unless the context clearly indicates otherwise. It should also be appreciated that the terms "comprise" and/or "include", when used in the specification, determine the existence of described features, integers, steps, operations, elements, and/or units, but do not exclude the existence or addition of one or more other features, integers, steps, operations, elements, units, and/or groups thereof. As used herein, the term "and/or" includes any and all combinations of relevant listed items.

For a thorough understanding of the present application, detailed steps and detailed structures will be provided in the following description to explain the technical solutions proposed by the present application. The preferred embodiments of the present application are described in detail as follows. However, in addition to these detailed descriptions, the present application may further have other implementations.

Figure 1:
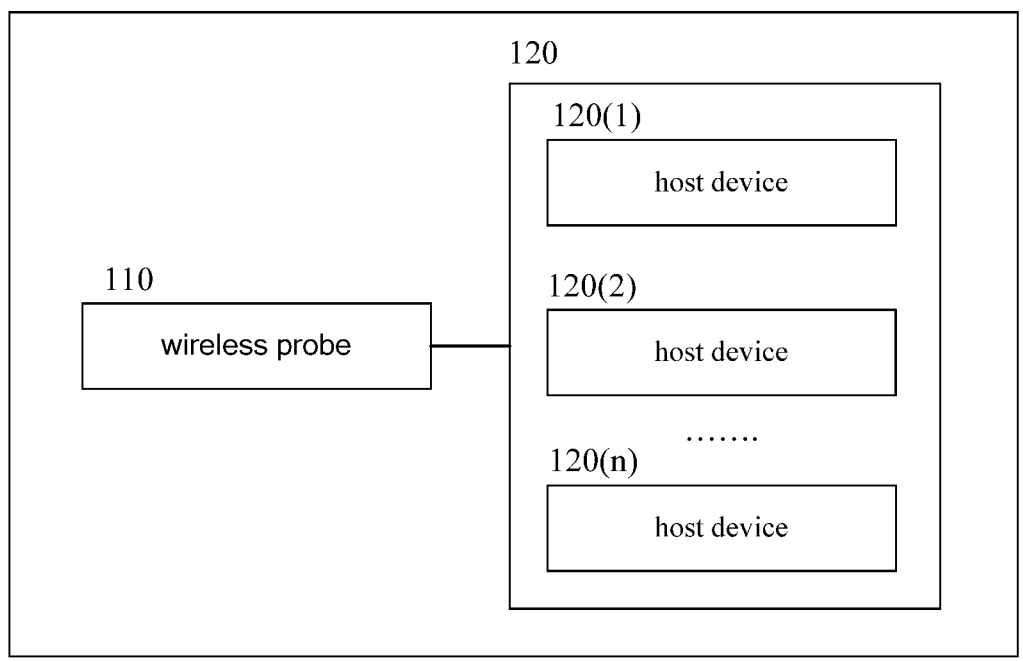
FIG. 1 is a schematic block diagram of an ultrasonic measurement system according to an embodiment of the present application.

First, an ultrasonic measurement system according to an embodiment of the present application will be described with reference to FIG. 1. FIG. 1 shows a schematic block diagram of an ultrasonic measurement system 100 according to an embodiment of the present application. As shown in FIG. 1, the ultrasonic measurement system 100 includes a wireless probe and at least two host devices. In the embodiment described in conjunction with FIG. 1, for simplicity's sake, the wireless probe is marked with reference numeral 110, the host devices are marked with 120, and different host devices are distinguished from each other by the numbers behind the reference numeral 120. In FIG. 1, there shows n host devices, i.e. 120(1), 120(2), . . . 120(n) respectively, where n is a natural number greater than 1. In the embodiment of the present application, the wireless probe 110 may obtain a predetermined policy for wirelessly connection with the host devices 120, where the preset policy may be factory settings of the wireless probe and/or the host device or be received by a third party, which is unlimited here. According to the predetermined policy, it is selectively connected to one of the at least two host devices 120, and performs ultrasound imaging on a target object jointly with the connected host device.

In the embodiment of the present application, each of the at least two host devices 120 is a device capable of wirelessly connecting with the wireless probe 110, and thus, each of the at least two host devices 120 at least has a component for wirelessly connecting with the wireless probe 110. In addition, in the embodiment of the present application, each of the at least two host devices 120 is configured such that can be wirelessly connected with the wireless probe 110 to form an ultrasonic measurement system to jointly realize ultrasonic imaging. Accordingly, each of the at least two host devices 120 has at least a component for ultrasound imaging. In the embodiments of the present application, ultrasound imaging may include not only generating ultrasound images, but also displaying ultrasound images. Correspondingly, each of the at least two host devices 120 may at least have a component for displaying ultrasound images, and may also have other components for generating ultrasound images. In the embodiment of the present application, the host devices 120 may be an ultrasound host, smart terminal, monitor, ventilator, anesthesia machine, etc. with the above components. In different application scenarios, the wireless probe 110 can select different host devices 120 to connect to build an ultrasonic measurement system to meet the measurement requirements in different application scenarios. The measurement in different application scenarios will be exemplified later.

In addition, in the embodiments of the present application, the terms "to realize ultrasound imaging jointly" or "to perform ultrasound imaging jointly" may be understood as: using the ultrasonic measurement system formed by the wireless probe 110 and the host devices 120 to realize ultrasound imaging which may, for example, include M steps (or links, where M is a natural number greater than 1), some of which may be completed by the wireless probe 110 and the rest of which may be completed by the host devices 120. The number of steps completed by the wireless probe 110 and the host devices 120 is not limited. For example, they can be allocated according to their respective data processing capabilities or allocated in other suitable ways.

In general, in the embodiment of the present application, since the wireless probe 110 can select the host devices 120 to be connected according to the predetermined policy, for example, choosing one of the host devices 120(1), 120(2), . . . 120(n) to be connected instead of only connecting a single host device. In other words, in the embodiment of the present application, the wireless probe 110 and the host devices 120 are not in a one-to-one relationship, but in a one-to-many relationship; in this respect, the wireless probe 110 can selectively connect an appropriate host device (for example, a host device suitable for the current application scenario) from multiple (at least two) host devices according to the predetermined policy, and dynamically form an ultrasound imaging system to realize ultrasound imaging, thereby meeting different business requirements in different application scenarios.

In an embodiment of the present application, the predetermined policy acquired by the wireless probe 110 may include: searching for available host devices 120 by the wireless probe 110, and selecting the host device 120 with the highest priority from searched host devices 120 according to a predetermined priority order of the host devices 120 for connection. In this embodiment, the wireless probe 110 may actively search for the available host devices 120. For example, the wireless probe 110 and the host devices 120 each have a Bluetooth module, and the wireless probe 110 can search for the available host devices 120 via Bluetooth. For another example, the wireless probe 110 and the host devices 120 each have an infrared module, and the wireless probe 110 can search for the available host devices 120 via infrared. For yet another example, the wireless probe 110 and the host devices 120 each have a WIFI network port, and the wireless probe 110 can search for the available host devices 120 via WIFI. Things like that can be done in a similar manner. After searching for the available host devices 120, the wireless probe 110 may select the host device 120 with the highest priority from the searched host devices 120 according to the predetermined priority order of the host device 120 for connection.

In yet another embodiment of the present application, the predetermined priority order of the host devices 120 may be preset according to specific requirements. That is, according to the requirements of an application scenario, the wireless probe may select the host device with the highest degree matching with the application scenario from the at least two host devices for connection, wherein the matching degree can be understood as the most practical host device in a certain application scenario.

For example, in an application scenario where two host devices, an ultrasound host 120(1) and a smart terminal 120(2), are provided, the priority of the host device 120(2) may be higher than that of the host device 120(1) when there needs to perform ultrasonic measurement on a certain target object cross floors. In such an application scenario, after searching for the host devices 120(1) and 120(2), the wireless probe 110 may, according to their priority order, select the host device 120(2) to connect to form the ultrasonic measurement system. For another example, in another application scenario where three host devices, the ultrasound host 120(1), the smart terminal 120(2) and a monitor 120(3), are provided, the priority order of the three host devices should be 120(3), 120(1) and 120(2), that is, the priority of the monitor is higher than that of the ultrasound host and the priority of the ultrasound host is higher than that of the smart terminal, when there needs a good ultrasound image display effect and some physiological data monitoring on the target object at the same time. In this application scenario, after searching out the host devices 120(1), 120(2) and 120(3), the wireless probe 110 may, according to their priority order, select the host device 120(3) to connect to form the ultrasonic measurement system.

In another embodiment of the present application, the predetermined priority order of the host devices 120 may also be defined and sorted according to device types of host devices. For example, in some scenarios, the priority of the ultrasound host devices may be higher than that of the smart terminal and the priority of the monitor may be higher than the smart terminal, and so on. Accordingly, the predetermined policy may further include: when the searched host devices 120 are of the same type, the wireless probe 110 may select the host device with the strongest connection signal from the searched host devices 120 for connection. In this embodiment, when there are a plurality of host devices of the same type are searched out by the wireless probe 110, for example, the searched host devices having the highest priority are more than one smart terminals, the wireless probe may select the smart terminal with the strongest connection signal to connect, or it may further to connect upon other properties of the smart terminal, such as selecting latest model with strong processing capability for connection.

The above exemplarily describes the setting of the predetermined priority order of the host devices 120. It should be understood that it is only an example, and the predetermined priority order of the host devices 120 may also be set according to other standards, as long as the requirements of the application scenario can be met.

In another embodiment of the present application, the predetermined policy acquired by the wireless probe 110 may include: searching for the wireless probe 110 and sending a connection request by each host device 120; after receiving the connection request, the wireless probe 110 selecting the host device with the highest priority from the host devices 120 sending the connection requests for connection upon the predetermined priority of the host devices 120. In this embodiment, the host devices 120 may actively search for the wireless probe 110 and send a connection request. For example, where the wireless probe 110 and the host devices 120 each have a Bluetooth module, the host device 120 may search for the wireless probe 110 via Bluetooth; or where the wireless probe 110 and the host devices 120 each have an infrared module, the host device 120 can search for the wireless probe 110 via infrared; or where the wireless probe 110 and the host devices 120 each have a WIFI internet port, the host device 120 can search for the wireless probe 110 via WWI; and so on. After searching out the wireless probe 110, the host devices 120 may send a connection request to the wireless probe 110. Then the wireless probe 110 may, after receiving the connection requests from the host devices 120, select the host device with the highest priority from the host devices 120 sending the connection requests for connection according to the predetermined priority order of the host devices 120. The predetermined priority order of the host devices 120 may be preset according to specific requirements, which has been described above, and will not be repeated here. In addition, similar to the foregoing example, when the device types of the host devices 120 sending the connection requests are the same, the wireless probe 110 may select the host device with the strongest connection signal from the host devices 120 sending the connection requests for connection, or it may further connect according to other properties of the host devices of the host device, such as selecting the latest model with strong processing power to connect, etc.

In another embodiment of the present application, the wireless probe 110 is connected when receiving the connection request, the predetermined policy may further include: determining, according to predetermined priority order of the host devices 120, by the wireless probe 110 whether there is a host device with a higher priority than the currently connected host device in the host devices 120 sending the connection request; when it exists, disconnecting the connection with the currently connected host device, and selecting the host device with the highest priority from the host devices 120 sending the connection requests for connection; and when it does not exist, selecting the host device with the same priority as the connected host device from the host devices 120 that send the connection requests for connection or ignoring received connection requests. Alternatively, the wireless probe 110 is connected when receiving the connection request, and the predetermined policy may further include: ignoring received connection requests. In the above-mentioned embodiment, the wireless probe 110 is connected when receiving the connection requests from the host devices 120, it may select the host device with a higher priority to connect, or it may select the host device with the same priority as the currently connected host device to connect, or it may ignore the received connection request. This is only an example. In other examples, the wireless probe 110 is connected when receiving connection requests from the host devices 120, it may also reconnect the host devices according to other policies or perform other operations.

In the embodiment of the present application, after selecting and connecting to any one of the host devices 120 (such as any one of the host devices 120(1), 120(2), . . . 120(n)) upon the aforesaid predetermined polity, the wireless probe 110 may performed ultrasound imaging together with the connected host device on the target object. As mentioned above, the wireless probe 110 and the host devices 120 each may perform steps which number is unlimited, for example, they may be assigned such execution steps according to their respective data processing capabilities or assigned in other suitable manners.

In one example, the wireless probe 110 can obtain the data processing capability of the host device 120 to which it is connected. Exemplarily, the wireless probe 110 can acquire the data processing capability of the host device 120 through real-time detection; for example, the data processing capability of the host device 120 may be determined according to a model of the host device 120, or the data processing capability of the host device 120 may be acquired by interacting with the host device 120. After acquiring the data processing capability of the connected host device 120, the wireless probe 110 can, according to data processing capability of the host device (and the data processing capability of the wireless probe itself), assign a data processing task that the host device is responsible for during ultrasound imaging to the host device, thereby performing ultrasound imaging together with the connected host device on the target object.

In another example, the host device 120 to which the wireless probe 110 is connected may also assign respective data processing tasks to itself and the wireless probe 110. In this example, the host device 120 to which the wireless probe 110 is connected can acquire the data processing capability of the wireless probe 110. Exemplarily, the host device 120 to which the wireless probe 110 is connected can obtain the data processing capability of the wireless probe 110 through real-time detection. For example, the host device 120 may determine the data processing capability of the wireless probe 110 according to a model of the wireless probe 110, or obtain the data processing capability of the wireless probe 110 by interacting with the wireless probe 110. Or the data processing capability of the wireless probe 110 may be predefined and stored in the host device 120. After acquiring the data processing capability of the wireless probe 110, the host device 120 to which the wireless probe 110 is connected can, according to data processing capability of the wireless probe 110 (and the data processing capability of the host device itself), assign the data processing task that the wireless probe 110 is responsible for during ultrasound imaging to the wireless probe 110, thereby performing ultrasound imaging together with the wireless probe 110 on the target object.

In the embodiment of the present application, the wireless probe 110 may include some or all of the following components: a power supply circuit configured to provide a required voltage to an internal circuit; a sound head used for electrical/acoustic conversion; a transmission waveform generation circuit configured to generate electrical pulse sequences & signals to stimulate the sound head to generate acoustic signals; echo signals receiving and processing circuit configured to process echo electrical signals received by the sound head; a wireless module configured to support a specific wireless network protocol; and a controller configured to control the wireless module, the transmitted waveform generating circuit, the echo signals receiving and processing circuit, and some ultrasound image synthesis and processing functions, receive control parameters transmitted by a user or the host device 120, and transmit working state of the probe and ultrasound images to host device 120. With the above components, the wireless probe 110 has a corresponding data processing capability. In the embodiment of the present application, the host device 120 may include some or all of the following components: a wireless communication port, an ultrasound image processing component, a storage component, a display component, and the like. With the above components, the host device 120 has a corresponding data processing capability.

The tasks that the wireless probe 110 and the host device 120 to which it is connected are responsible for are described below with two examples. In one example, the wireless probe 110 may transmit the ultrasonic waves to the target object, and receive echoes based on the ultrasonic waves to obtain an ultrasonic echo signals; then, the host device 120 connected to the wireless probe 110 may process the ultrasonic echo signals to obtain a target ultrasonic data of the target object and display the target ultrasonic data. In another example, the wireless probe 110 may transmit the ultrasonic waves to the target object, and receive an echo based on the ultrasonic waves to obtain an ultrasonic echo signal; then, the wireless probe 110 may process the ultrasonic echo signals to obtain the target ultrasonic data of the target object, and finally display the target ultrasonic data through the host device 120. It should be understood that this is only an example, and the tasks that the wireless probe 110 and the host device 120 to which it is connected are respectively responsible for may also be in other situations, which will not be described here.

In general, the wireless probe 110 and the host device 120 may be connected via a specific wireless network (in a direct connection between the wireless probe 110 and the host device 120, or in an indirect connection through an intermediate device, such as establishing a connection with an intermediary or gateway device), and be dynamically selected to form a complete ultrasonic measurement system to support the user to perform ultrasonic examination. The policy can be automatically executed with specific algorithm and software, also can have manual participation. The formed complete ultrasonic measurement system can have functions including user input and output control, ultrasound imaging, data storage and transmission, etc. The function of ultrasound imaging can include sequence control of transmitted electrical signals, waveform generation, acoustic-electric conversion, electro-acoustic conversion, echo electrical signal amplification and filtering, analog-to-digital sampling, digital signal processing, digital ultrasound image processing, ultrasound image display and so on.

In further embodiments of the present application, at least one of the host devices 120 may have components for other medical functions, so as to perform corresponding medical operations while performing ultrasound imaging. For example, it has been mentioned in the previous description that the host devices 120 may be a monitor, a ventilator, an anesthesia machine or other medical devices. In addition to their own medical function components, these medical devices also have components that are wirelessly connected to the wireless probe 110 and some components used for ultrasound imaging. In this embodiment, the host devices 120 may not only display the ultrasound results (such as ultrasound images) of the target object, but also display other medical data related to its own medical functions at the same time, which can meet the needs of application scenarios for different medical projects simultaneously.

Based on the above description, the ultrasonic measurement system according to the embodiment of the present application can control the wireless probe to select an appropriate host device for connection according to a predetermined policy, so as to meet different service requirements in different application scenarios.

In another embodiment of the present application, at least one host device in the host devices 120 may further have an port connected with a wired probe, so that the host device can be connected to both the wired probe and the wireless probe. Correspondingly, the host device can perform ultrasound imaging jointly with the wired probe, and/or the host device can perform ultrasound imaging jointly with the wireless probe, wherein both the processes of ultrasound imaging may be performed simultaneously or in sequence, or one of them may be performed selectively based on actual situation. Jointly performing ultrasound imaging can be understood as: transmitting pulse waves and receiving echoes to acquire the echo signals by the probe, and processing the echo signals and displaying the ultrasound image by the host device. Of course, the ultrasound image can also be displayed by the probe, which is not specifically limited here.

Different examples of the ultrasonic measurement method performed by the ultrasonic measurement system 100 according to the embodiment of the present application will be described below with reference to FIGS. 2 to 5.

Figure 2:
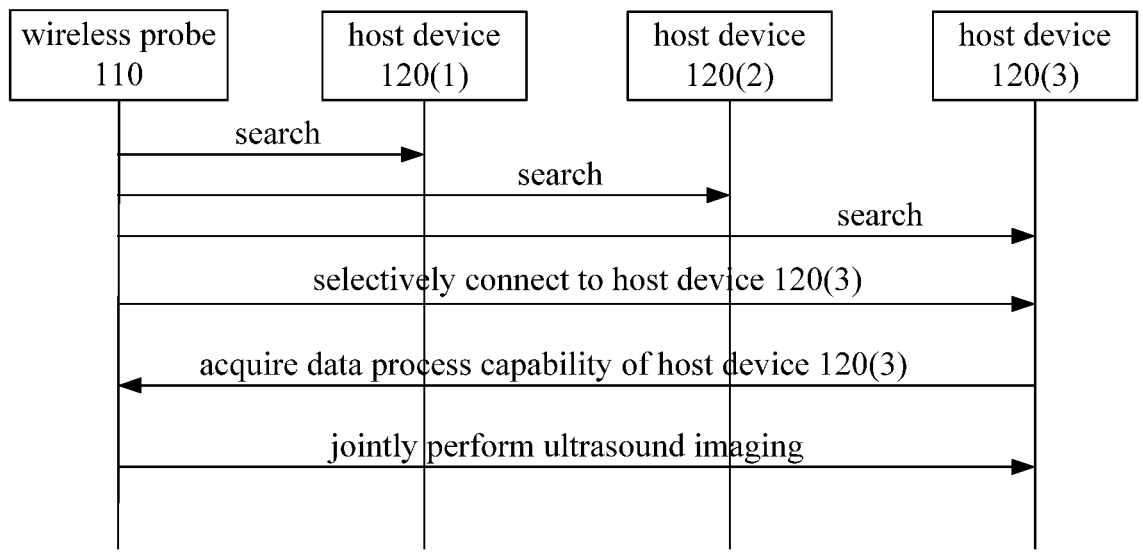
FIG. 2 is an example of an ultrasonic measurement method performed by an ultrasonic measurement system according to an embodiment of the present application.

FIG. 2 shows an example of an ultrasonic measurement method 200 performed by the ultrasonic measurement system 100 according to an embodiment of the present application. As shown in FIG. 2, in the method 200, the wireless probe 110 searches for an available host device 120, and finds the host devices 120(1) to 120(3), that is, an ultrasound host, an smart terminal, and a monitor. In the corresponding application scenario, it requires good ultrasound image display effect and needs some physiological data monitoring on the target object at the same time. The priority order of the host devices 120(1) to 120(3) in this application scenario is: 120(3), 120(1), 120(2), that is, the priority of the monitor is higher than that of the ultrasound host, and the priority of the ultrasound host is higher than that of the smart terminal. Based on the priority order of the host devices 120(1) to 120(3), the wireless probe 110 may select the host device 120(3) for connection. Next, the wireless probe 110 may obtain the data processing capability of the host device 120(3), and assign, according to its own data processing capability and the data processing capability of the host device 120(3), corresponding data processing tasks to the host device 120(3) to perform ultrasound imaging together with the host device 120(3) on the target object.

Figure 3:
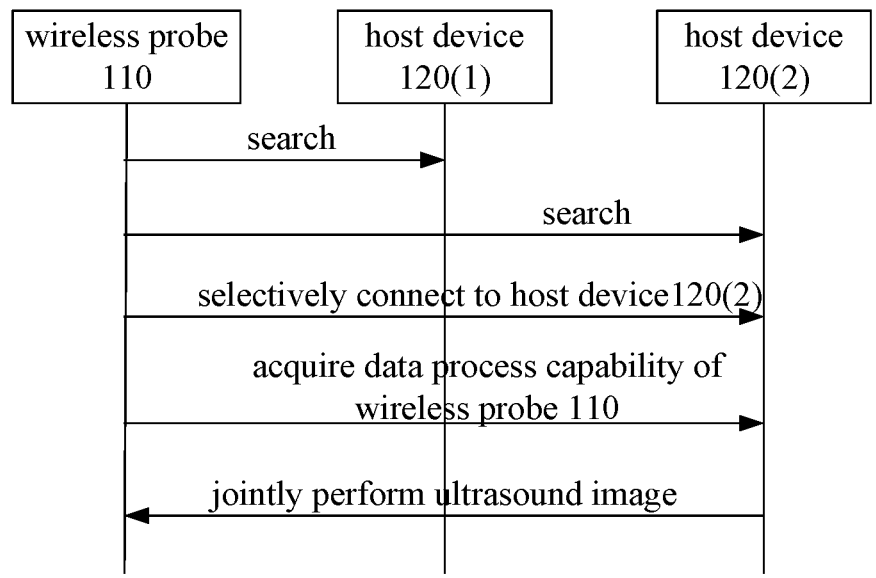
FIG. 3 is another example of an ultrasonic measurement method performed by an ultrasonic measurement system according to an embodiment of the present application.

FIG. 3 shows an example of an ultrasonic measurement method 300 performed by the ultrasonic measurement system 100 according to an embodiment of the present application. As shown in FIG. 3, in the method 300, the wireless probe 110 searches for an available host device 120, and finds the ultrasound host 120(1) and the smart terminal 120(2). In the corresponding application scenario, it requires to perform ultrasonic measurement on a target object across floors. The priority order of host devices 120(1) to 120(2) in the application scenario is: 120(2), 120(1), that is, the priority of the smart terminal is higher than that of the ultrasound host. Based on the priority order of the host devices 120(1) and 120(2), the wireless probe 110 may select the host device 120(2) for connection. Next, the host device 120(2) may acquire the data processing capability of the wireless probe 110, and assign, according to its own data processing capability and the data processing capability of the wireless probe 110, corresponding data processing tasks to the wireless probe 110 to perform ultrasound imaging together with the wireless probe 110 on the target object.

Figure 4:
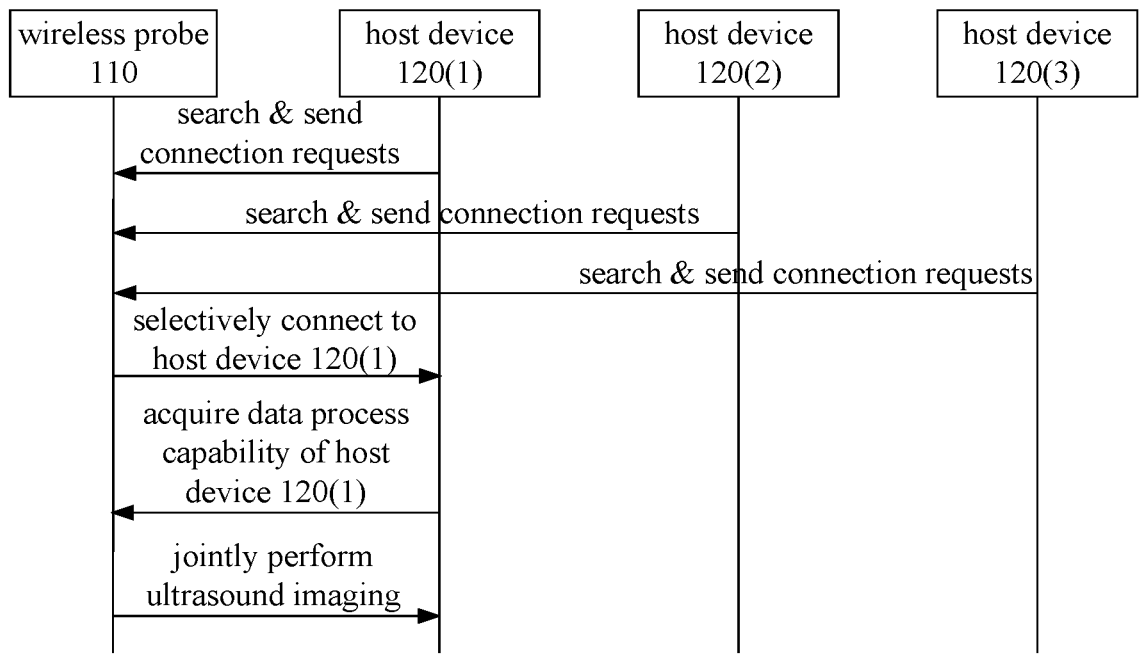
FIG. 4 is yet another example of the ultrasonic measurement method performed by an ultrasonic measurement system according to an embodiment of the present application.

FIG. 4 shows an example of an ultrasonic measurement method 400 performed by the ultrasonic measurement system 100 according to an embodiment of the present application. As shown in FIG. 4, in method 400, the host devices 120(1) to 120(3), i.e. the ultrasound host, the smart terminal and the ventilator, may search for the wireless probe 110 and send a connection request to the wireless probe 110. In the corresponding application scenario, it requires a good ultrasound image display effect. The priority order of the host devices 120(1) to 120(3) in the scenario is: 120(1), 120(2), 120(3), that is, the priority of the ultrasound host is higher than that of the smart terminal, and the priority of the smart terminal is higher than that of the ventilator. Based on the priority order of the host devices 120(1) to 120(3), the wireless probe 110 may select the host device 120(1) for connection. Next, the wireless probe 110 may obtain the data processing capability of the host device 120(1), and assign, according to its own data processing capability and the data processing capability of the host device 120(1), corresponding data processing tasks to the host device 120(1) to perform ultrasound imaging together with the host device 120(1) on the target object.

Figure 5:
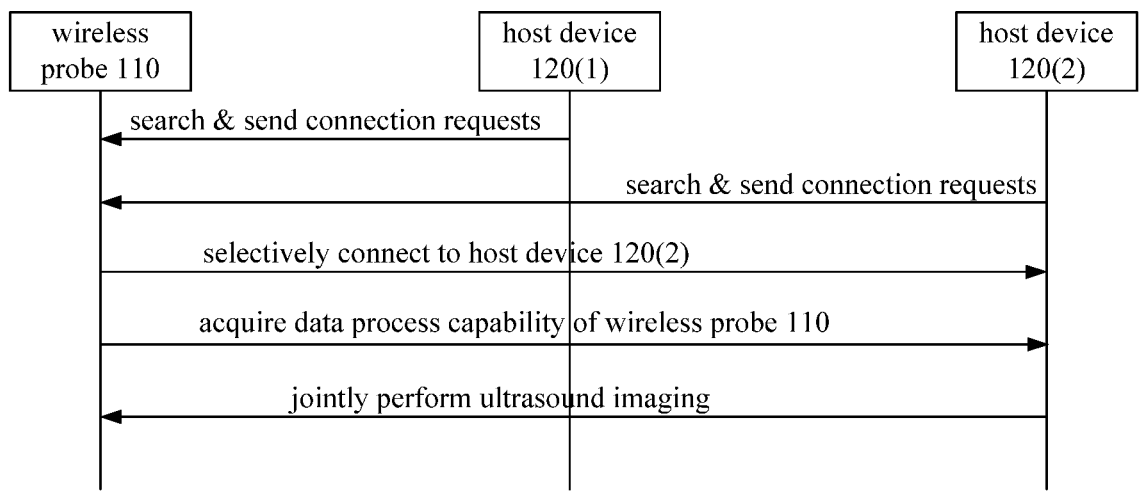
FIG. 5 is still another example of an ultrasonic measurement method performed by an ultrasonic measurement system according to an embodiment of the present application.

FIG. 5 shows an example of an ultrasonic measurement method 500 performed by the ultrasonic measurement system 100 according to an embodiment of the present application. As shown in FIG. 5, in method 500, the host devices 120(1) and 120(2), i.e. the ultrasound host and the anesthesia machine, search for the wireless probe 110 and send a connection request to the wireless probe 110. In the corresponding application scenario, it requires to perform ultrasound measurement and anesthesia on the target object. In this application scenario, the priority order of the host devices 120(1) to 120(2) is: 120(2), 120(1), that is, the priority of the anesthesia machine is higher than that of the ultrasound host. Based on the priority order of the host devices 120(1) and 120(2), the wireless probe 110 may select the host device 120(2) for connection. Next, the host device 120 (2) may acquire the data processing capability of the wireless probe 110, and assign, according to its own data processing capability and the data processing capability of the wireless probe 110, corresponding data processing tasks to the wireless probe 110 to perform ultrasound imaging together with the wireless probe 110 on the target object.

The above exemplarily shows some examples of the ultrasonic measurement method that can be implemented by the ultrasonic measurement system 100 according to the embodiment of the present application. Based on the description of the above examples, the ultrasonic measurement system 100 according to the embodiment of the present application can control the wireless probe to select an appropriate host device according to the predetermined policy for connection, meeting different business requirements in different application scenarios.

Figure 6:
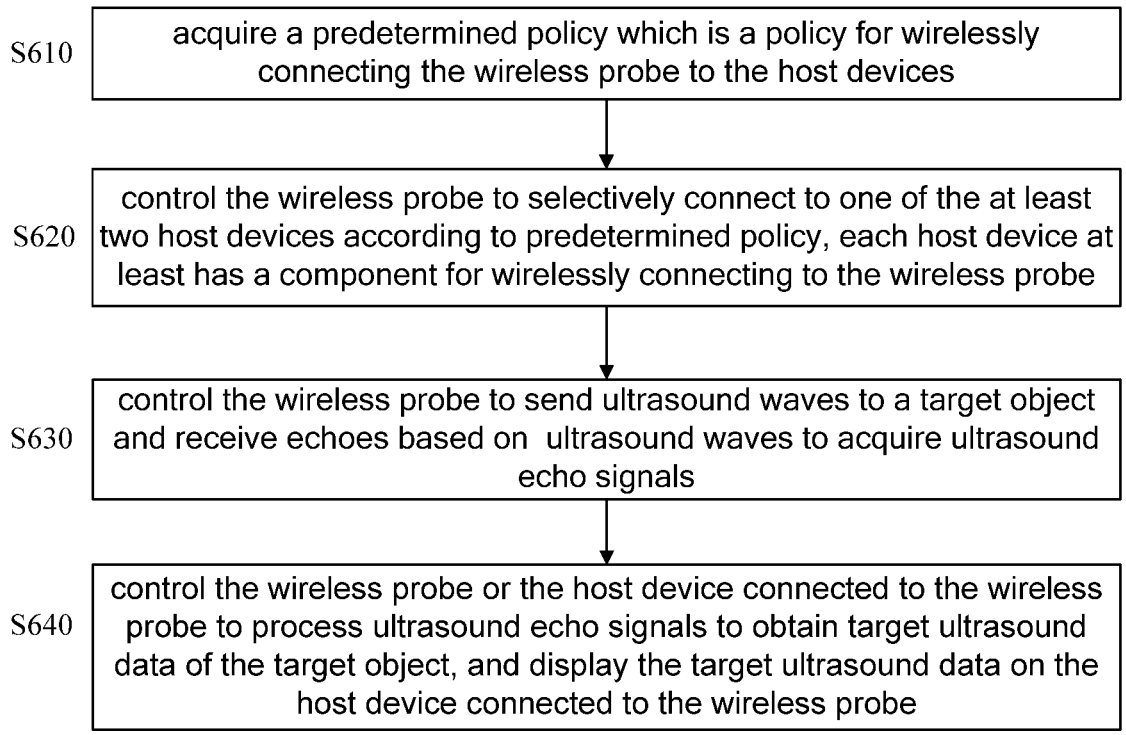
FIG. 6 is a schematic flowchart of an ultrasonic measurement method according to an embodiment of the present application.

The ultrasonic measurement method according to the embodiment of the present application will be described below with reference to FIG. 6. FIG. 6 shows a schematic flow chart of the ultrasonic measurement method 600 according to the embodiment of the present application. The ultrasonic measurement method 600 according to the embodiment of the present application may be executed by the ultrasonic measurement system 100 described above, and those skilled in the art may understand the detailed flow of the ultrasonic measurement method 600 by combining the above description. For the sake of brevity, only the main operations of the ultrasonic measurement method 600 are described here, and some details will not be repeated. As shown in FIG. 6, the ultrasonic measurement method 600 may include the following steps:

In step S610, a predetermined policy is obtained, wherein the predetermined policy is a policy for wirelessly connecting the wireless probe to the host devices.

In step S620, the wireless probe is controlled to selectively connect with one host device from at least two host devices according to the predetermined policy, wherein each of the host devices at least has a component for wirelessly connecting with the wireless probe.

In step S630, the wireless probe is controlled to transmit ultrasonic waves to the target object, and echoes based on the ultrasonic waves is received to obtain ultrasonic echo signals.

In step S640, the wireless probe or the host device connected to the wireless probe is controlled to process the ultrasonic echo signals to obtain the target ultrasonic data of the target object, and the target ultrasonic data is displayed by the host device to which the wireless probe is connected.

The ultrasonic measurement method 600 according to the embodiment of the present application can control the wireless probe to select an appropriate host device for connection according to a predetermined policy, so as to meet different service requirements in different application scenarios.

Figure 7:
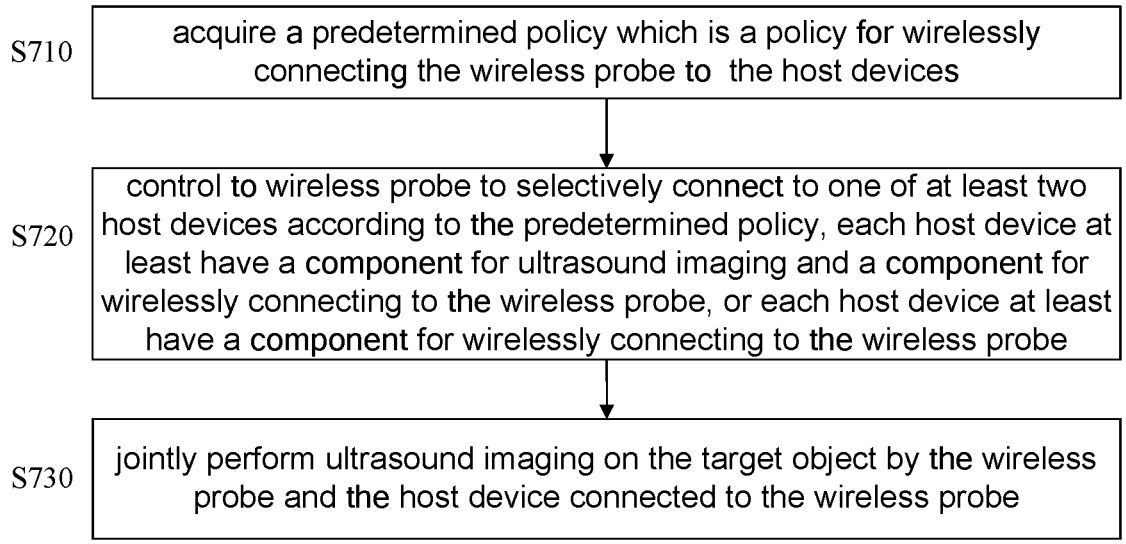
FIG. 7 is a schematic flowchart of an ultrasonic measurement method according to another embodiment of the present application.

The ultrasonic measurement method according to another embodiment of the present application will be described below with reference to FIG. 7. FIG. 7 shows a schematic flowchart of an ultrasonic measurement method 700 according to an embodiment of the present application. The ultrasonic measurement method 700 according to an embodiment of the present application may be performed by the ultrasonic measurement system 100 described above, and those skilled in the art may understand the detailed flow of the ultrasonic measurement method 700 in combination with the above description. For the sake of brevity, only the main operations of the ultrasonic measurement method 700 are described here, and some details will not be repeated. As shown in FIG. 7, the ultrasonic measurement method 700 may include the following steps:

In step S710, a predetermined policy is obtained, where the predetermined policy is a policy for wirelessly connecting the wireless probe to the host device.

In step S720, the wireless probe is controlled to selectively connect with one host device from at least two host devices according to the predetermined policy, wherein each of the host devices at least has a component for ultrasound imaging and a component that is wirelessly connected to the wireless probe, or each of the host devices at least has a component that is wirelessly connected to the wireless probe.

In step S730, ultrasonic imaging is performed on the target object jointly by the wireless probe and the host device to which the wireless probe is connected.

The ultrasonic measurement method 700 according to the embodiment of the present application can control the wireless probe to select an appropriate host device for connection according to a predetermined policy, so as to meet different service requirements in different application scenarios.

In the above-mentioned ultrasonic measurement method 600 and ultrasonic measurement method 700, in an example, the obtained determined policy may include: searching for available host devices by the wireless probe, and selecting the host device with the highest priority from the searched host devices according to the predetermined priority order of the host devices for connection. Exemplarily, the predetermined priority order is defined and sorted according to device types of host devices, and the predetermined policy may further include: selecting the host device with the strongest connection signals by the wireless probe from the searched host devices when the types of the searched host devices are the same.

In the above-mentioned ultrasonic measurement method 600 and ultrasonic measurement method 700, in another example, the acquired determined policy may include: searching for the wireless probe by each of the host devices and sending a connection request; and after receiving the connection request, the wireless probe selecting the host device with the highest priority from host devices that send the connection requests according to the predetermined priority order of the host devices for connection. Exemplarily, the predetermined priority order is defined and sorted according to device types of host devices, and the predetermined policy may further include: selecting the host device with the strongest connection signals by the wireless probe from the host devices for connection when the types of the host devices that send the connection requests are the same. The wireless probe is connected when receiving the connection requests, and the predetermined policy may further include: determining, by the wireless probe according to the predetermined priority order, whether there is a host device with a higher priority than the currently connected host device in the host device that sends the connection request; when there is, disconnecting the currently connected host device, and selecting the host device with the highest priority from host devices that send the connection requests for connection; and when there isn't, selecting the host device with the same priority as the connected host device from host devices that send the connection requests for connection, or ignoring received connection requests. Alternatively, the wireless probe is connected when receiving the connection request, and the predetermined policy may further include: ignoring received connection requests.

In the above-mentioned ultrasonic measurement method 600 and ultrasonic measurement method 700, the predetermined priority order of the host devices in the predetermined policy may be defined according to the requirements of the application scenario.

In the above-mentioned ultrasonic measurement method 600 and ultrasonic measurement method 700, before jointly performing ultrasound imaging on the target object, the host device to which the wireless probe is connected may assign, according to data processing capability of the wireless probe, the data processing task that the wireless probe is responsible for during ultrasonic imaging to the wireless probe; or before jointly performing ultrasound imaging on the target object, the wireless probe may assign, according to data processing capability of the host device, the data processing task that the host device is responsible for to the host device. The data processing capability of the wireless probe is detected in real time or predefined by the host device to which the wireless probe is connected; and the data processing capability of the host device is detected in real time by the wireless probe. For example, the data processing capability of the wireless probe is determined by the host device to which the wireless probe is connected according to the model of the wireless probe; and the data processing capability of the host device is determined by the wireless probe according to the model of the host device. Alternatively, the data processing capability of the wireless probe is determined by the host device connected to the wireless probe according to the interaction with the wireless probe; and the data processing capability of the host device is determined by the wireless probe according to the interaction with the host device to which the wireless probe is connected.

In the above-mentioned ultrasonic measurement method 600 and ultrasonic measurement method 700, at least one of the at least two host devices may also have a component for other medical functions to perform corresponding medical operations while performing ultrasonic imaging. When the wireless probe is connected with the host device having the component for other medical functions, the ultrasonic measurement method 600 and the ultrasonic measurement method 700 may also include: simultaneously displaying ultrasonic images and medical data corresponding to the medical operation on the host device having the component for other medical functions.

In the above-mentioned ultrasonic measurement method 600 and ultrasonic measurement method 700, the host device may include at least two of the following equipment: the ultrasonic host, the monitor, the ventilator, the anesthesia machine, and the smart terminal.

Figure 8:
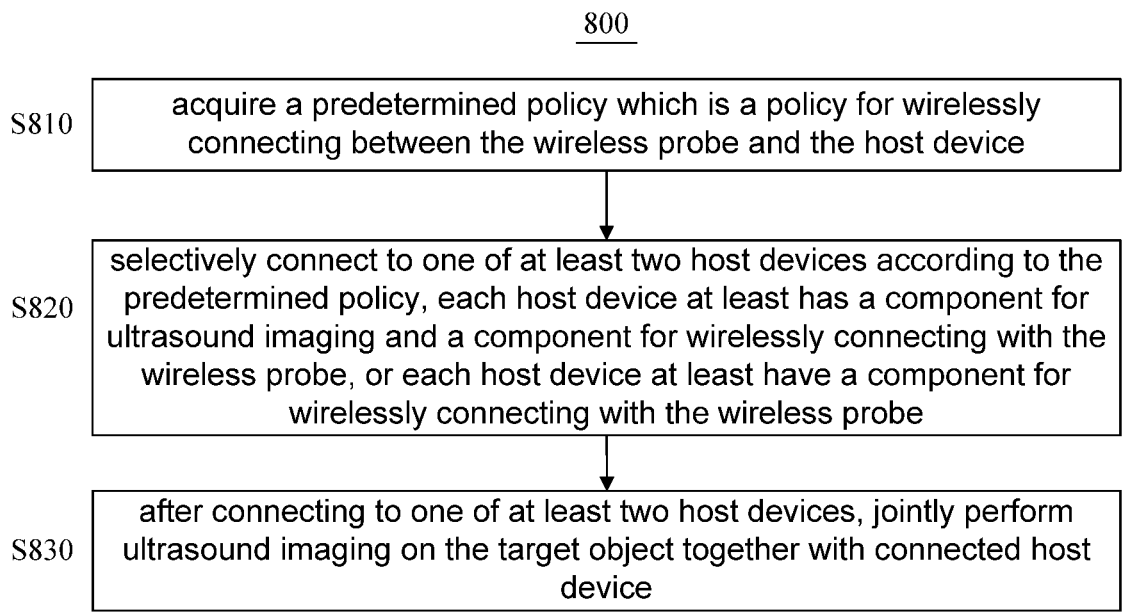
FIG. 8 is a schematic flowchart of an ultrasonic measurement method according to yet another embodiment of the present application.

The ultrasonic measurement method according to the embodiment of the present application is described below with reference to FIG. 8. FIG. 8 shows a schematic flow chart of the ultrasonic measurement method 800 according to the embodiment of the application. The ultrasonic measurement method 800 according to the embodiment of the application can be performed by the wireless probe 110 in the ultrasonic measurement system 100 described above, that is, the above-mentioned ultrasonic measurement methods 600 and 700 are described from the perspective of wireless probe 110, and those skilled in the art can understand the detailed process of the ultrasonic measurement method 800 in combination with the above description. For simplicity, only the main operations of the ultrasonic measurement method 800 are described here, and some details will not be repeated. As shown in FIG. 8, the ultrasonic measurement method 800 can include the following steps:

In step S810, a predetermined policy is obtained, where the predetermined policy is a policy for wirelessly connecting the wireless probe to the host device.

In step S820, one of at least two host devices is selectively connected according to the predetermined policy, wherein each of the host devices at least has a component for ultrasonic imaging and a component for wireless connection with the wireless probe, or each of the host devices at least has a component for wireless connection with the wireless probe.

In step S830, after connecting with one of the at least two host devices, ultrasonic imaging is performed on the target object together with the connected host device.

In the above-mentioned ultrasonic measurement method 800, in an example, the obtained predetermined policy can include: searching for available host devices, and selecting the host device with the highest priority from the searched host devices for connection according to the predetermined priority order of the host devices. The predetermined priority order can be defined and sorted according to device types of host devices, and the predetermined policy can also include: selecting the host device with the strongest connection signals from the searched host devices to connect when the type of the searched host device is the same.

In the above-mentioned ultrasonic measurement method 800, in another example, the obtained predetermined policy may include: receiving connection requests from at least two host devices, and selecting the host device with the highest priority from host devices that send the connection requests to connect according to the predetermined priority order of the host devices. The predetermined priority order can be defined and sorted according to device types of host devices, and the predetermined policy may also include: when receiving the connection requests of the same device type of host device, selecting the host device with the strongest connection signals from the same type of host device to connect. The wireless probe is connected when receiving the connection requests, and the predetermined policy may also include: determining whether there is a host device with a higher priority than the currently connected host device in the host device that sends the connection requests according to the predetermined priority order; when there is, disconnecting the currently connected host device, and selecting the host device with the highest priority from host devices that send the connection requests to connect; and when there isn't, selecting the host device with the same priority as the connected host device from the host device that send the connection requests to connect, or ignoring received connection requests. Alternatively, the wireless probe is connected when receiving the connection request, and the predetermined policy may also include: ignoring received connection requests.

In the above ultrasonic measurement method 800, before jointly performing ultrasound imaging on the target object, the data processing task that the wireless probe is responsible for during ultrasound imaging may also be received by the host device to which the wireless probe is connected. The data processing task is determined by the host device to which the wireless probe is connected according to data processing capability of the wireless probe; Alternatively, before jointly performing ultrasound imaging of the target object, the host device is assigned the data processing task that the host device is responsible for during ultrasound imaging according to data processing capacity of the host device. The data processing capability of the wireless probe is real-time detected or predefined by the host device to which the wireless probe is connected; and the data processing capability of the host device is detected in real time by the wireless probe. For example, the data processing capability of the wireless probe is determined by the host device to which the wireless probe is connected according to the model of the wireless probe; and the data processing capacity of the host device is determined by the wireless probe according to the model of the host device. Alternatively, the data processing capability of the wireless probe is determined by the host device to which the wireless probe is connected according to the interaction with the wireless probe; and the data processing capability of the host device is determined by the wireless probe according to the interaction with the host device to which the wireless probe is connected.

In the above ultrasonic measurement method 800, at least one of the at least two host devices may also have a component for other medical functions to perform corresponding medical operations while performing ultrasound imaging. When the wireless probe is connected with the host device having the component with the other medical functions, the above ultrasonic measurement method 800 may also include: displaying ultrasound images and medical data corresponding to the medical operation on the host device having the component with the other medical functions at the same time.

In the above-mentioned ultrasonic measurement method 800, the host device may include at least two of the following equipment: the ultrasound host, the monitor, the ventilator, the anesthesia machine, and the smart terminal.

The ultrasonic measurement method 800 according to the embodiment of the present application can control the wireless probe to select an appropriate host device for connection according to a predetermined policy, so as to meet different service requirements in different application scenarios.

Figure 9:
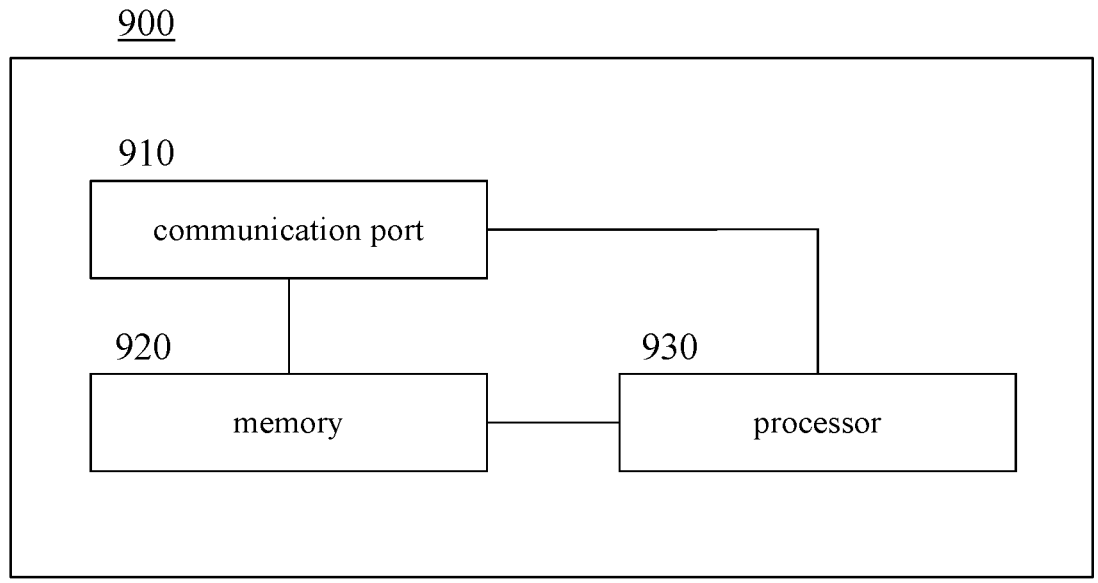
FIG. 9 is a schematic block diagram of a wireless probe according to an embodiment of the present application.

The wireless probe according to the embodiment of the present application is described below with reference to FIG. 9. FIG. 9 shows a schematic block diagram of a wireless probe 900 according to an embodiment of the present application. As shown in FIG. 9, the wireless probe 900 may include a communication port 910, a processor 930 and a memory 920 on which a computer program run by the processor 930 is stored. The computer program, when executed by the processor 930, may perform the operations carried out by the wireless probe 110 in the ultrasonic measurement system 100 described above, i.e., the ultrasonic measurement method 800 described above. Those skilled in the art can understand the structure and specific operation of each component of the wireless probe 900 in combination with the above description, which is not repeated here for brevity.

Figure 10:
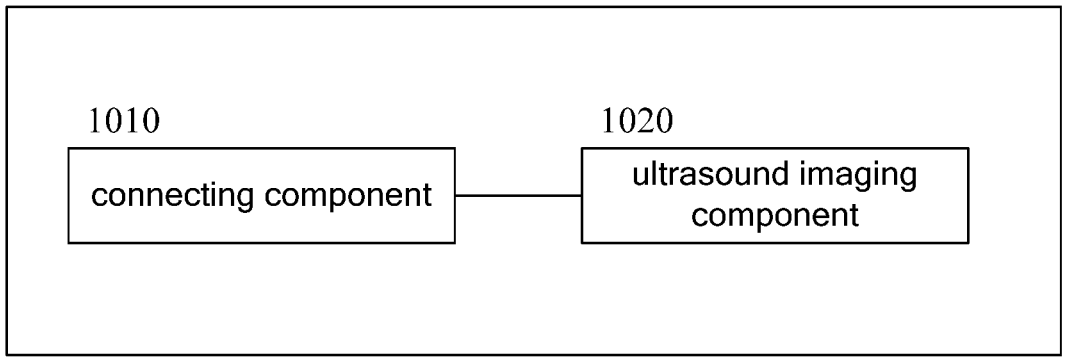
FIG. 10 is a schematic block diagram of a host device according to an embodiment of the present application.

The host device according to the embodiment of the present application is described below with reference to FIG. 10. FIG. 10 shows a schematic block diagram of a host device 1000 according to an embodiment of the present application. As shown in FIG. 10, the host device 1000 may include a connecting component 1010 and an ultrasound imaging component 1020. The connecting component 1010 may be connected with the wireless probe, and the ultrasound imaging component 1020 may be configured to perform ultrasound imaging on the target object together with the wireless probe. The host device 1000 may perform the operations carried out by the host device 120 in the ultrasonic measurement system 100 described above. Those skilled in the art can understand the structure and specific operation of each component of the host device 1000 in combination with the above description, which is not repeated here for brevity.

Figure 11:
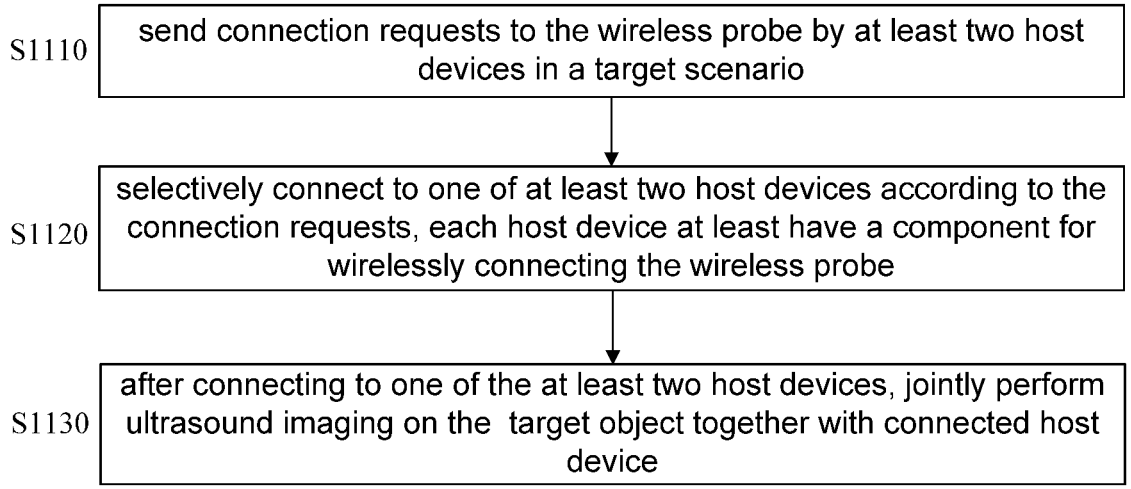
FIG. 11 is a schematic flowchart of an ultrasonic measurement method according to yet another embodiment of the present application.

The ultrasonic measurement method according to yet another embodiment of the present application will be described below with reference to FIG. 11. FIG. 11 shows a schematic flowchart of an ultrasonic measurement method 1100 according to yet another embodiment of the present application. The ultrasonic measurement method 1100 according to the embodiment of the present application may be performed by the wireless probe 110 in the ultrasonic measurement system 100 described above, and may also be performed by the wireless probe 900 described in the above description. As shown in FIG. 11, the ultrasonic measurement method 1100 may include the following steps:

In step S1110, the connection requests sent to the wireless probe by at least two host devices in a target scenario are obtained.

In step S1120, one of the at least two host devices is select to be connected according to the connection request, wherein each of the host devices at least has a component for wirelessly connecting with the wireless probe.

In step S1130, after connecting to one of the at least two host devices, the target object may be performed ultrasound imaging together with the connected host device.

In this embodiment of the present application, the connection requests obtained in step S1110 may be obtained through an intermediate device; for example, the host device may send connection requests to the wireless probe through a third party (intermediate device), and the wireless probe may obtain the connection requests through the intermediate device. Of course, the host device can also directly send connection requests to the wireless probe, and accordingly, the wireless probe directly obtains the connection requests from the host devices.

In this embodiment of the present application, selecting to connect to one of the at least two host devices in step S1120 may also be performed based on the predetermined priority order of the at least two host devices. In this embodiment, the host device with the highest priority may be selected from the at least two host devices for connection according to the predetermined priority order of the host devices. In an example, the priority order of the host devices may be defined according to application scenarios, and the priority order of the host devices may be different in different application scenarios.

In the embodiment of the present application, the method 1100 may further include (not shown in FIG. 11): before jointly performing ultrasound imaging on the target object, assigning the data processing task that the wireless probe is responsible for during ultrasound imaging to the wireless probe by the host device connected to the wireless probe according to data processing capability of the wireless probe; or before jointly performing ultrasonic imaging on the target object, assigning the data processing task that the host device is responsible for during ultrasound imaging to the host device by the wireless probe according to data processing capability of the host device. In this embodiment, the wireless probe and the host device can perform corresponding data processing tasks according to their respective data processing capabilities, and can jointly complete the ultrasound imaging of the target object more efficiently.

Based on the above description, the ultrasonic measurement method 1100 according to the embodiment of the present application can control the wireless probe to selectively connect to different host devices, which provides the possibility to meet different service requirements in different application scenarios.

Figure 12:
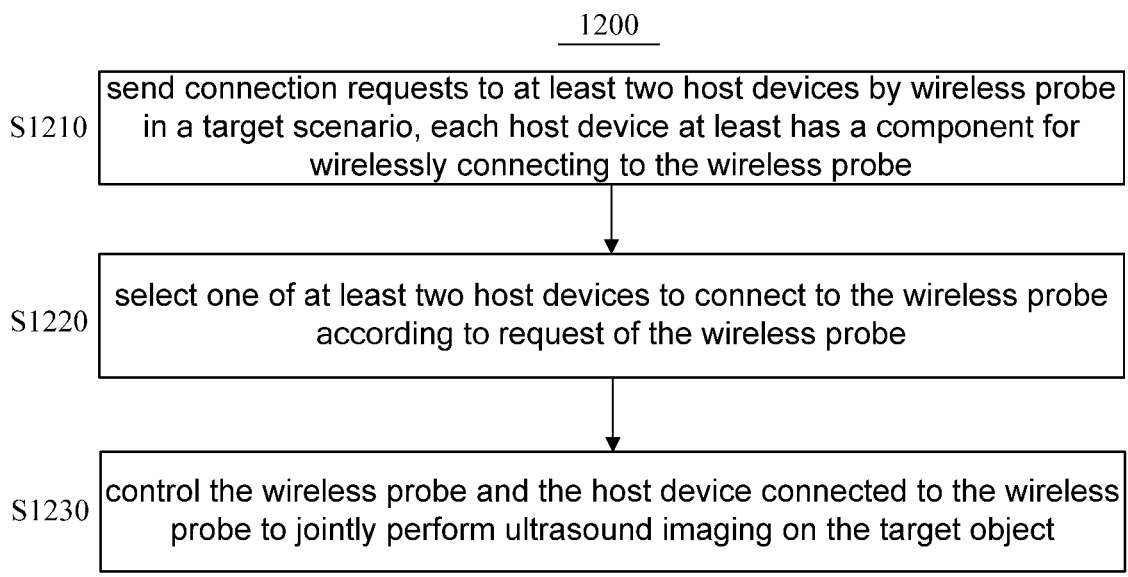
FIG. 12 is a schematic flowchart of an ultrasonic measurement method according to still another embodiment of the present application.

The ultrasonic measurement method according to still another embodiment of the present application will be described below with reference to FIG. 12. FIG. 12 shows a schematic flowchart of an ultrasonic measurement method 1200 according to still another embodiment of the present application. The ultrasonic measurement method 1200 according to the embodiment of the present application may be performed by the ultrasonic measurement system 100 described above. As shown in FIG. 12, the ultrasonic measurement method 1200 may include the following steps:

In step S1210, connection requests sent by the wireless probe in the target scenario to at least two host devices is obtained, wherein each of the host devices at least has a component for wireless connection with the wireless probe.

In step S1220, one of the at least two host devices is selected to connect with the wireless probe according to the request of the wireless probe.

In step S1230, the wireless probe and the host device to which the wireless probe is connected are controlled to jointly perform ultrasound imaging on the target object.

In this embodiment of the present application, selecting one of the at least two host devices to connect to the wireless probe in step S1220 may also be performed based on the predetermined priority order of the at least two host devices. In this embodiment, the host device with the highest priority may be selected from the at least two host devices for connection according to the predetermined priority order of the host devices. In an example, the priority order of the host devices may be defined according to application scenarios, and the priority order of the host devices may be different in different application scenarios.

In the embodiment of the present application, the method 1200 may further include (not shown in FIG. 12): before jointly performing ultrasound imaging on the target object, assigning the data processing task that the wireless probe is responsible for during ultrasound imaging to the wireless probe by the host device connected to the wireless probe according to data processing capability of the wireless probe; or before jointly performing ultrasound imaging on the target object, assigning the data processing task that the host device is responsible for during ultrasound imaging to the host device by the wireless probe according to data processing capability of the host device. In this embodiment, the wireless probe and the host device can perform corresponding data processing tasks according to their respective data processing capabilities, and can jointly perform ultrasound imaging on the target object more efficiently.

Based on the above description, the ultrasonic measurement method 1200 according to the embodiment of the present application can control the wireless probe to selectively connect to different host devices, which provides the possibility to meet different business requirements in different application scenarios.

In addition, according to an embodiment of the present application, a storage medium, on which program instructions are stored, is also provided. The program instructions, when run by a computer or a processor, are used to execute corresponding steps of the ultrasonic measurement method 600, 700, 800, 1100, and 1200 according to the embodiment of the present application. The storage medium may include, for example, a memory card of a smart phone, a storage component of a tablet computer, a hard disk of a personal computer, a read-only memory (ROM) unit, an erasable programmable read-only memory (EPROM) unit, a portable compact disk read-only memory (CD-ROM) unit, USB memory, or any combination of the above storage media. The computer-readable storage medium can be any combination of one or more computer-readable storage media.

In addition, according to the embodiments of the present application, a computer program is also provided, and the computer program can be stored in the cloud or on a local storage medium. When the computer program is run by a computer or a processor, it is used to execute the corresponding steps of the ultrasonic measurement method according to the embodiments of the present application.

Based on the above description, the ultrasonic measurement method, system, wireless probe, and storage medium according to the embodiments of the present application can control the wireless probe to select an appropriate host device for connection according to a predetermined policy, so as to meet different business requirements in different application scenarios.

While example embodiments have been described herein with reference to the accompanying drawings, it should be understood that the above example embodiments are merely illustrative and are not intended to limit the scope of the disclosure thereto. Those of ordinary skill in the art may make various changes and modifications therein without departing from the scope and spirit of the disclosure. All such changes and modifications are intended to be included in the scope of the disclosure as claimed in the appended claims.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by hardware or software depends on particular applications and design constraint conditions of the technical solutions. Those skilled in the art could use different methods to implement the described functions for each particular application, but such implementation should not be considered to be beyond the scope of the disclosure.

In several embodiments provided in the present application, it should be understood that the disclosed devices and methods may be implemented in other ways. For example, the device embodiments described above are merely exemplary. For example, the division of units is merely a logical function division. In actual implementations, there may be other division methods. For example, a plurality of units or components may be combined or integrated into another device, or some features may be omitted or not implemented.

A large number of specific details are explained in this specification provided herein. However, it can be understood that the embodiments of the disclosure can be practiced without these specific details. In some instances, well-known methods, structures, and technologies are not shown in detail, so as not to obscure the understanding of this description.

Similarly, it should be understood that in order to simplify the disclosure and help to understand one or more of various aspects of the disclosure, in the description of the exemplary embodiments of the disclosure, various features of the disclosure are sometimes together grouped into an individual embodiment, figure or description thereof. However, the method of the disclosure should not be construed as reflecting the following intention: namely, the disclosure set forth requires more features than those explicitly stated in each claim. More precisely, as reflected by the corresponding claims, the inventive point thereof lies in that features that are fewer than all the features of an individual embodiment disclosed may be used to solve the corresponding technical problem. Therefore, the claims in accordance with the particular embodiments are thereby explicitly incorporated into the particular embodiments, wherein each claim itself serves as an individual embodiment of the disclosure.

Those skilled in the art should understand that, in addition to the case where features are mutually exclusive, any combination may be used to combine all the features disclosed in this specification (along with the appended claims, abstract, and drawings) and all the processes or units of any of methods or devices as disclosed. Unless explicitly stated otherwise, each feature disclosed in this specification (along with the appended claims, abstract, and drawings) may be replaced by an alternative feature that provides the same, equivalent, or similar object.

Furthermore, those skilled in the art should understand that although some of the embodiments described herein comprise some but not other features included in other embodiments, combinations of features of different embodiments are meant to be within the scope of the disclosure, and form different embodiments. For example, in the claims, any one of the embodiments set forth thereby can be used in any combination.

Various embodiments regarding components in the disclosure may be implemented in hardware, or implemented by software modules running on one or more processors, or implemented in a combination thereof. It should be understood for those skilled in the art that a microprocessor or a digital signal processor (DSP) may be used in practice to implement some or all of the functions of some modules according to the embodiments of the disclosure. The disclosure may further be implemented as an apparatus program (e.g. a computer program and a computer program product) for executing some or all of the methods described herein. Such a program for implementing the disclosure may be stored on a computer-readable medium, or may be in the form of one or more signals. Such signals may be downloaded from an Internet website, or provided on a carrier signal, or provided in any other form.

It should be noted that the description of the disclosure made in the above-mentioned embodiments is not to limit the disclosure, and those skilled in the art may design alternative embodiments without departing from the scope of the appended claims. In the claims, any reference signs placed between parentheses should not be construed as limitation on the claims. The disclosure may be implemented by means of hardware comprising several different elements and by means of an appropriately programmed computer. In unit claims listing several apparatuses, several of these apparatuses may be specifically embodied by one and the same item of hardware. The use of the terms "first", "second", "third", etc. does not indicate any order. These terms may be interpreted as names.

The above is only the specific embodiment of the present disclosure or the description of the specific embodiment, and the protection scope of the present disclosure is not limited thereto. Any changes or substitutions should be included within the protection scope of the present disclosure. The protection scope of the present disclosure shall be subject to the protection scope of the claims.

The invention claimed is:

1. An ultrasonic measurement method, comprising:
   acquiring a predetermined policy, the predetermined policy being a policy involving a wireless connection between a wireless probe and a host device;
   controlling the wireless probe to selectively connect to one host device from at least two host devices according to the predetermined policy, each of the at least two host devices at least having a component for wirelessly connecting to the wireless probe, wherein the at least two host devices have different device types, the predetermined policy comprises selecting and connecting to a host device with a highest priority from the at least two host devices with different device types according to a predetermined priority order of the at least two host devices, the predetermined priority order of the at least two host devices varies depending on different application scenarios, and the at least two host devices comprise at least two of: an ultrasound host, a monitor, a ventilator, an anesthesia machine, and a smart terminal;
   controlling the wireless probe to transmit ultrasonic waves to a target object and receive echoes based on the ultrasonic waves to obtain ultrasonic echo signals; and
   controlling the wireless probe or the host device connected to the wireless probe to process the ultrasonic echo signals to acquire target ultrasonic data of the target object, and displaying the target ultrasonic data by the host device connected to the wireless probe.

2. The method according to claim 1, wherein the predetermined policy further comprises:
   searching for available host devices by the wireless probe, and selecting a host device with the highest priority from the searched host devices according to the predetermined priority order of the host devices for connection.

3. The method according to claim 1, wherein the predetermined policy further comprises:

searching for the wireless probe by each of the at least two host devices and sending connection requests; and after receiving the connection requests, selecting, by the wireless probe, a host device with the highest priority from the at least two host devices that send the connection requests according to the predetermined priority order of the at least two host devices for connection.

4. The method according to claim 3, wherein the wireless probe is connected when receiving the connection requests, the predetermined policy further comprises:

determining, by the wireless probe, whether there exists a host device with a higher priority than that of a currently connected host device in the at least two host devices that send the connection requests according to the predetermined priority order;

when it exists, disconnecting the currently connected host device and selecting the host device with the highest priority from the at least two host devices sending the connection requests; and when it does not exist, selecting the host device with a same priority as that of the currently connected host device from the at least two host devices sending the connection requests, or ignoring the connection requests.

5. The method according to claim 3, wherein the wireless probe is connected when receiving the connection requests, the predetermined policy further comprises:

ignoring the connection requests.

6. The method according to claim 2, wherein the predetermined priority order is defined according to requirements of an application scenario, and the predetermined policy further comprises:

selecting, by the wireless probe, the host device with a highest degree matching the application scenario from the at least two host devices for connection according to the requirements of the application scenario.

7. The method according to claim 1, further comprising:

before jointly performing ultrasound imaging on the target object, assigning, by the host device connected with the wireless probe, to the wireless probe a data processing task that the wireless probe is responsible for during the ultrasound imaging according to data processing capability of the wireless probe; or before jointly performing ultrasound imaging on the target object, assigning, by the wireless probe, to the host device a data processing task that the host device is responsible for during the ultrasound imaging according to data processing capability of the host device.

8. The method according to claim 7, wherein the data processing capability of the wireless probe is detected in real time or predefined by the host device to which the wireless probe is connected; and the data processing capability of the host device is detected in real time by the wireless probe.

9. The method according to claim 8, wherein the data processing capability of the wireless probe is determined by the host device connected to the wireless probe according to a model of the wireless probe; and the data processing capability of the host device is determined by the wireless probe according to a model of the host device.

10. The method according to claim 8, wherein the data processing capability of the wireless probe is determined by the host device connected to the wireless probe according to an interaction with the wireless probe; and the data processing capability of the host device is determined by the wireless probe according to an interaction with the host device to which the wireless probe is connected.

11. The method according to claim 1, wherein at least one of the at least two host devices further comprises at least one component for other medical functions to perform corresponding medical operations while performing ultrasound imaging.

12. The method according to claim 11, wherein, when the wireless probe is connected to the host device having the at least one component for other medical functions, the method further comprises:

simultaneously displaying an ultrasound image and medical data corresponding to the medical operations on the host device having the component(s) for other medical functions.

13. The method according to claim 1, wherein when the at least two host devices at least comprise the ultrasound host and the smart terminal, a priority of the smart terminal is higher than that of the ultrasound host when an application scenario needs to perform ultrasonic measurement on the target object cross floors.

14. The method according to claim 1, wherein when the at least two host devices comprise at least two of the ultrasound host, the smart terminal and the monitor, a priority of the monitor is higher than that of the ultrasound host and the priority of the ultrasound host is higher than that of the smart terminal when an application scenario needs a good ultrasound image display effect and at least one physiological data monitoring on the target object at the same time.

15. The method according to claim 1, wherein when the at least two host devices comprise at least two of the ultrasound host, the smart terminal and the ventilator, a priority of the ultrasound host is higher than that of the smart terminal and the priority of the smart terminal is higher than that of the ventilator, when an application scenario needs a good ultrasound image display effect.

16. The method according to claim 1, wherein when the at least two host devices at least comprise the ultrasound host and the anesthesia machine, a priority of the anesthesia machine is higher than that of the ultrasound host, when an application scenario needs to perform ultrasound measurement and anesthesia on the target object.

17. An ultrasonic measurement method, comprising:

acquiring connection requests sent by at least two host devices to a wireless probe in a target scenario;

selectively connecting with one of the at least two host devices according to the connection requests, each of the at least two host devices at least having a component for wirelessly connecting to the wireless probe, wherein the at least two host devices have different device types, selectively connecting with one of the at least two host devices is achieved based on a predetermined priority order of the at least two host devices, the predetermined priority order of the at least two host devices varies depending on different application scenarios, and the at least two host devices comprise at least two of: an ultrasound host, a monitor, a ventilator, an anesthesia machine, and a smart terminal; and after being connected to one of the at least two host devices, performing ultrasound imaging on a target object jointly with the connected host device.

18. The method of claim 17, wherein the connection requests are received via an intermediate device.

19. An ultrasonic measurement method, comprising:

acquiring a connection request sent by a wireless probe to at least two host devices in a target scenario, each of the at least two host devices at least having a component for wirelessly connecting to the wireless probe;

selecting to connect one of the at least two host devices with the wireless probe according to the connection request from the wireless probe, wherein the at least two host devices have different device types, selecting to connect one of the at least two host devices with the wireless probe is achieved based on a predetermined priority order of the at least two host devices, the predetermined priority order of the at least two host devices varies depending on different application scenarios, and the at least two host devices comprise at least two of: an ultrasound host, a monitor, a ventilator, an anesthesia machine, and a smart terminal; and controlling the wireless probe and the host device to which the wireless probe is connected to jointly perform ultrasound imaging on a target object.

* * * * *